United States Patent
Booz et al.

(10) Patent No.: US 10,132,553 B2
(45) Date of Patent: Nov. 20, 2018

(54) DRAIN PAN REMOVABLE WITHOUT THE USE OF TOOLS

(71) Applicant: Johnson Controls Technology Company, Holland, MI (US)

(72) Inventors: Neil D. Booz, Gulfport, FL (US); Angus B. Latham, St. Petersburg, FL (US); Beau G. Brooks, Pinellas Park, FL (US)

(73) Assignee: Johnson Controls Technology Company, Auburn Hills, MI (US)

( * ) Notice: Subject to any disclaimer, the term of this patent is extended or adjusted under 35 U.S.C. 154(b) by 102 days.

(21) Appl. No.: 15/202,361

(22) Filed: Jul. 5, 2016

(65) Prior Publication Data

US 2018/0010844 A1    Jan. 11, 2018

(51) Int. Cl.
*F25D 21/14* (2006.01)
*F24F 13/22* (2006.01)
*F16N 31/00* (2006.01)

(52) U.S. Cl.
CPC ............ *F25D 21/14* (2013.01); *F24F 13/222* (2013.01); *F16N 31/00* (2013.01); *F16N 31/002* (2013.01); *F16N 31/006* (2013.01); *F25D 2321/144* (2013.01)

(58) Field of Classification Search
CPC ............... F25D 21/14; F25D 2321/144; F25D 2321/1441; F25D 2321/1442; F16N 31/00; F16N 31/002; F16N 31/006; F16N 31/004
USPC ........ 220/571–573, 752, 756, 760, 767–769, 220/772, 773, 775, 776, 759
See application file for complete search history.

(56) References Cited

U.S. PATENT DOCUMENTS

| 1,684,558 | A | * | 9/1928 | Schwarz | F25D 21/14 62/288 |
|---|---|---|---|---|---|
| 1,899,852 | A | * | 2/1933 | Chadwick | F25D 21/14 62/131 |
| 2,215,665 | A | * | 9/1940 | Hedlund | F25D 21/14 312/246 |
| 3,812,617 | A | * | 5/1974 | Brody | A47G 7/041 220/760 |
| 3,927,812 | A | * | 12/1975 | Winters | B65D 25/2873 220/757 |

(Continued)

FOREIGN PATENT DOCUMENTS

| JP | S54-41562 A | 4/1979 |
|---|---|---|
| KR | 2015-0030879 A | 3/2015 |

(Continued)

OTHER PUBLICATIONS

The International Search Report and Written opinion issued by European Patent Office dated Oct. 25, 2016 for PCT patent application No. PCT/US2016/028123.

(Continued)

*Primary Examiner* — Jeffrey Allen
*Assistant Examiner* — Jennifer Castriotta
(74) *Attorney, Agent, or Firm* — Fletcher Yoder, P.C.

(57) ABSTRACT

A drainage system comprising a first bracket having a horizontal structure and one or more vertical structures, a second bracket having a horizontal structure and one or more vertical structures and a drain pan having a plurality of locking mechanisms, each configured to interlock with one of the vertical structures of the first bracket or the second bracket.

12 Claims, 3 Drawing Sheets

(56) References Cited

U.S. PATENT DOCUMENTS

| | | | |
|---|---|---|---|
| 4,417,687 A | 11/1983 | Grant | |
| 4,783,971 A * | 11/1988 | Alba | F25D 21/14 |
| | | | 248/225.11 |
| 5,251,815 A | 10/1993 | Foye | |
| 5,452,739 A * | 9/1995 | Mustee | A47L 15/4212 |
| | | | 137/312 |
| 6,112,536 A * | 9/2000 | Hansen | F25D 21/14 |
| | | | 62/285 |
| 6,363,736 B1 | 4/2002 | Kunkel et al. | |
| 6,431,127 B2 | 8/2002 | Weber | |
| 7,667,376 B2 | 2/2010 | Schmidt | |
| 7,692,411 B2 | 4/2010 | Trainor et al. | |
| 7,781,943 B1 | 8/2010 | Hamel et al. | |
| 7,830,072 B2 | 11/2010 | Schmidt | |
| 7,864,507 B2 | 1/2011 | Fleig et al. | |
| 7,884,727 B2 | 2/2011 | Tran | |
| 7,982,439 B2 | 7/2011 | Trainor et al. | |
| 8,086,352 B1 | 12/2011 | Elliott | |
| 8,228,151 B2 | 7/2012 | Schmidt | |
| 8,249,731 B2 | 8/2012 | Tran et al. | |
| 8,350,519 B2 | 1/2013 | Brantner et al. | |
| 8,531,047 B2 | 9/2013 | Schmidt et al. | |
| 8,621,245 B2 | 12/2013 | Sgearer et al. | |
| 9,197,143 B1 | 11/2015 | Townsend et al. | |
| 2001/0025610 A1 | 10/2001 | Weber | |
| 2004/0159713 A1 | 8/2004 | Schmidt et al. | |
| 2005/0040782 A1 | 2/2005 | Jasinski et al. | |
| 2005/0087616 A1 | 4/2005 | Attridge | |
| 2005/0144963 A1 | 7/2005 | Peterson et al. | |
| 2005/0258259 A1 | 11/2005 | Stanimirovic | |
| 2005/0270151 A1 | 12/2005 | Winick | |
| 2005/0278069 A1 | 12/2005 | Bash et al. | |
| 2006/0281435 A1 | 12/2006 | Shearer et al. | |
| 2007/0182362 A1 | 8/2007 | Trainor et al. | |
| 2008/0083446 A1 | 4/2008 | Chakraborty et al. | |
| 2009/0102296 A1 | 4/2009 | Greene et al. | |
| 2009/0168305 A1 | 7/2009 | Fleig et al. | |
| 2009/0251099 A1 | 10/2009 | Brantner et al. | |
| 2010/0060231 A1 | 3/2010 | Trainor et al. | |
| 2010/0090656 A1 | 4/2010 | Shearer et al. | |
| 2010/0139306 A1 | 6/2010 | Krenik | |
| 2010/0277270 A1 | 11/2010 | Aikens et al. | |
| 2010/0315046 A1 | 12/2010 | Trainor et al. | |
| 2011/0034120 A1 | 2/2011 | Jaiyeola | |
| 2011/0077758 A1 | 3/2011 | Tran et al. | |
| 2011/0109102 A1 | 5/2011 | McCoy et al. | |
| 2011/0115222 A1 | 5/2011 | Parker et al. | |
| 2011/0158806 A1 | 6/2011 | Arms et al. | |
| 2011/0172828 A1 | 7/2011 | Schmidt et al. | |
| 2011/0208450 A1 | 8/2011 | Salka et al. | |
| 2012/0068669 A1 | 3/2012 | Trainor et al. | |
| 2012/0072030 A1 | 3/2012 | Elliott | |
| 2012/0085774 A1 * | 4/2012 | Luburic | B65D 25/32 |
| | | | 220/754 |
| 2012/0256492 A1 | 10/2012 | Song et al. | |
| 2013/0013120 A1 | 1/2013 | Sabripour | |
| 2013/0024029 A1 | 1/2013 | Tran et al. | |
| 2013/0181689 A1 | 7/2013 | Ocalan | |
| 2013/0201316 A1 | 8/2013 | Binder et al. | |
| 2013/0206784 A1 * | 8/2013 | Short | B65D 25/2811 |
| | | | 220/760 |
| 2013/0217294 A1 | 8/2013 | Karunaratne | |
| 2013/0328416 A1 | 12/2013 | Whitworth et al. | |
| 2014/0111032 A1 | 4/2014 | Shearer et al. | |
| 2014/0222216 A1 | 8/2014 | Chen | |
| 2014/0330438 A1 | 11/2014 | Haines et al. | |
| 2016/0007525 A1 | 1/2016 | Drew et al. | |

FOREIGN PATENT DOCUMENTS

| | | |
|---|---|---|
| RU | 2538514 C1 | 1/2015 |
| WO | 2014/018304 A1 | 1/2014 |

OTHER PUBLICATIONS

The invitation to pay additional fees and, where applicable, protest fee mailed by European Patent Office dated Jul. 25, 2016 for PCT patent application No. PCT/US2016/028123.

* cited by examiner

DRAIN PAN REMOVABLE WITHOUT THE USE OF TOOLS

TECHNICAL FIELD

The present disclosure relates generally to drainage systems for equipment, and more specifically to a drain pan that can be readily installed on equipment without the use of tools, using two or more brackets that are adapted to be easily attached to common surfaces.

BACKGROUND OF THE INVENTION

Condensate drain pans are used to collect condensate, but are typically installed with connectors that require machine tools to attach. The space around the condensate drain pans is typically crowded with other equipment that makes using machine tools difficult or impossible.

SUMMARY OF THE INVENTION

A drainage system is disclosed that includes a first bracket having a horizontal structure, such as a flat surface, and one or more vertical structures, such as legs. A second bracket also has a horizontal structure, such as a flat surface, and one or more vertical structures, such as legs. A drain pan has locking mechanisms that correspond to the legs of the brackets, which interlock with one of the legs of the first bracket or the second bracket.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
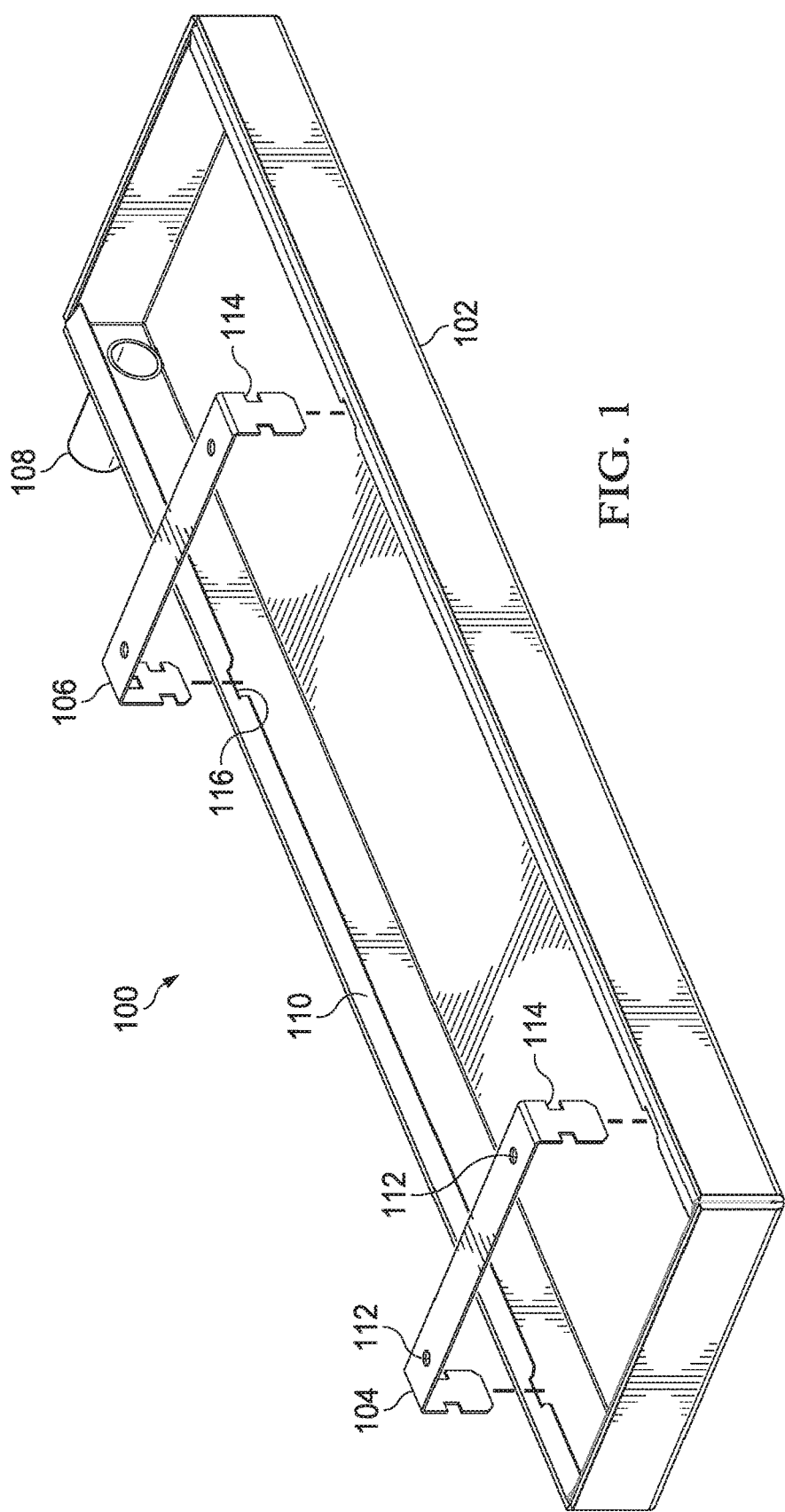
FIG. 1 is a diagram of a tool-less and removable condensate drain pan in accordance with an exemplary embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Fan coil units for cooling systems use a fan to force air past metal coils, which are used to hold expanding pressurized gas in what is commonly called an "evaporator" coil. As the gas expands, it absorbs heat from the metal coils, which results in the temperature of the metal coils being reduced. The air that is forced past the metal coils is also subsequently cooled as heat from the air is transferred to the metal coils, which results in a lowered dew point of the air and condensation of water vapor from the air on the coils. Any particulate matter in the air can also be deposited on the surface of the evaporator coils with the condensate, such that the metal coils will require periodic maintenance. This maintenance includes cleaning and possibly replacing the condensate drain pan, if needed due to fouling or accumulation of particulate matter. The present disclosure provides a mechanism to allow the drain pan to be removed without the need for a power tool or hand tool. The present disclosure can also or alternatively be used for water coils, steam coils or any other coils that can leak, such as for leak protection.

Condensate drain pans used in the prior art typically require a power tool or hand tool to install or remove, or complex bracket designs that are incorporated with the cooling coil supports. These prior art condensate drain pans create issues because access to the drain pans may be limited and severely inhibit tool access, or the complex brackets may not be compatible with an existing design for cooling coils. In contrast, the present disclosure provides a condensate drain pan that has an attachment mechanism that can be secured to a suitable surface of the associated cooling system, to allow the condensate drain pan to be attached to the unit at a location where the cooling coils are directly above the pan.

The tool-less removable condensate drain pan of the present disclosure can be used in a cooling system such as with heating, ventilation and air conditions ("HVAC") equipment that utilizes a condensate drain pan to drain condensate from a hydronic or direct expansion cooling coil. The disclosed tool-less drain pan can be sloped in two planes to provide a gravity-fed condensate collection to a main drain line, so as to comply with ASHRAE 62 IAQ requirements.

The disclosed drain pan can be removed without the use of a service tool, such as a screw driver, hex nut driver, hex head wrench, socket wrench or other service tools. The mounting brackets and condensate drain pan mounting interface provide a slope to the drain pan in two planes, to cause any condensate to flow to the drain pan's main drain line using only the force of gravity. Because the disclosed drain pan and support brackets can be readily adapted to existing designs, they can be used for units with internal or external drain pans.

FIG. 1 is a diagram of a tool-less and removable condensate drain pan 100, in accordance with an exemplary embodiment of the present disclosure. Drain pan 100 includes drain pan body 102, which can be formed from injection molded plastic, sheet metal or other suitable materials. Support brackets 104 and 106 are used to hold drain pan body 102, and are configured as described in greater detail herein to interface with and drain pan body 102, and securely hold drain pan body 102 in position during use. Drain pipe 108 can be used to drain condensate from drain pan body 102, can couple to a drain line (not explicitly shown) or can otherwise be used to control condensate disposal.

Support brackets 104 and 106 each include two vertical supports and a horizontal support with mounting holes 112, which are used in conjunction with a bolt, screw, rivet or other suitable attachment devices to attach support brackets 104 and 106 to a suitable surface. In one exemplary embodiment, support brackets 104 and 106 can be attached to the external underside structural surface of an evaporator coil support, such as by using mounting holes and an associated attachment device, by welding, epoxy or in other suitable manners. In another exemplary embodiment, support brackets 104 and 106 can be attached to an internal surface of a device that includes evaporator cooling coils, such as HVAC units, refrigerator units, ice makers or other suitable devices. Support brackets 104 and 106 also have two mechanical locking interfaces 114 that interlock with a corresponding mechanical locking interface 116 on an upper surface 110 or lip of the drain pan body 102, such that drain pan body includes four mechanical locking interfaces 116. These mechanical locking interfaces are described in greater detail below.

In one exemplary embodiment, drain pan body 102 can be configured to have an incline towards condensate drain 108, such as by having an incline from support bracket 104 towards support bracket 106, an incline from the side opposite condensate drain 108 towards the side on which condensate drain 108 is installed, or in other suitable manners. In another exemplary embodiment, support brackets 104 and 106 can be configured to provide an incline to drain pan body 102 towards condensate drain 108, such as by providing support bracket 104 with shorter vertical supports than support bracket 106, by providing vertical supports that are shorter on the side opposite condensate drain 108 or in other suitable manners.

Figure 2:
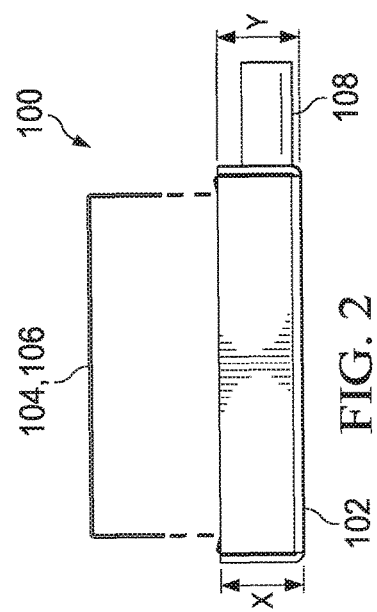
FIG. 2 is a side view of a tool-less and removable condensate drain pan in accordance with an exemplary embodiment of the present disclosure.

FIG. 2 is a side view of a tool-less and removable condensate drain pan 100 in accordance with an exemplary embodiment of the present disclosure. As shown in FIG. 2, drain pan body 102 can have a depth "X" along the side opposite from condensate drain 108 and a depth "Y" along the side on which condensate drain 108 is attached, where X is less than Y, so as to create an incline in the direction of condensate drain 108.

Figure 3:
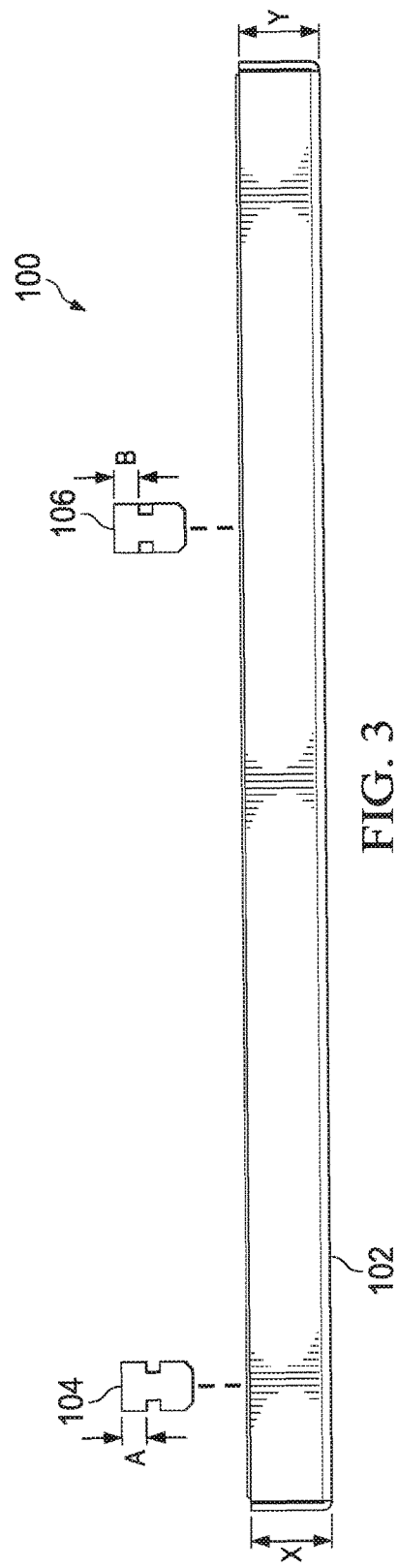
FIG. 3 is a front view of a tool-less and removable condensate drain pan in accordance with an exemplary embodiment of the present disclosure.

FIG. 3 is a front view of a tool-less and removable condensate drain pan in accordance with an exemplary embodiment of the present disclosure. As shown in FIG. 3, drain pan body 102 can have a depth "X" along the end opposite from condensate drain 108 and a depth "Y" along the end on which condensate drain 108 is attached, where X is less than Y, so as to create an incline in the direction of condensate drain 108. Also shown in FIG. 3 is dimension A, which is the distance between the top of support bracket 104 and mechanical locking interface 114 that interfaces with the corresponding mechanical locking interface 116 of drain pan body 102, and the corresponding dimension B, which is the distance between the top of support bracket 106 and the corresponding mechanical locking interface 116 of drain pan body 102 for that side of support bracket 106.

Figure 4:
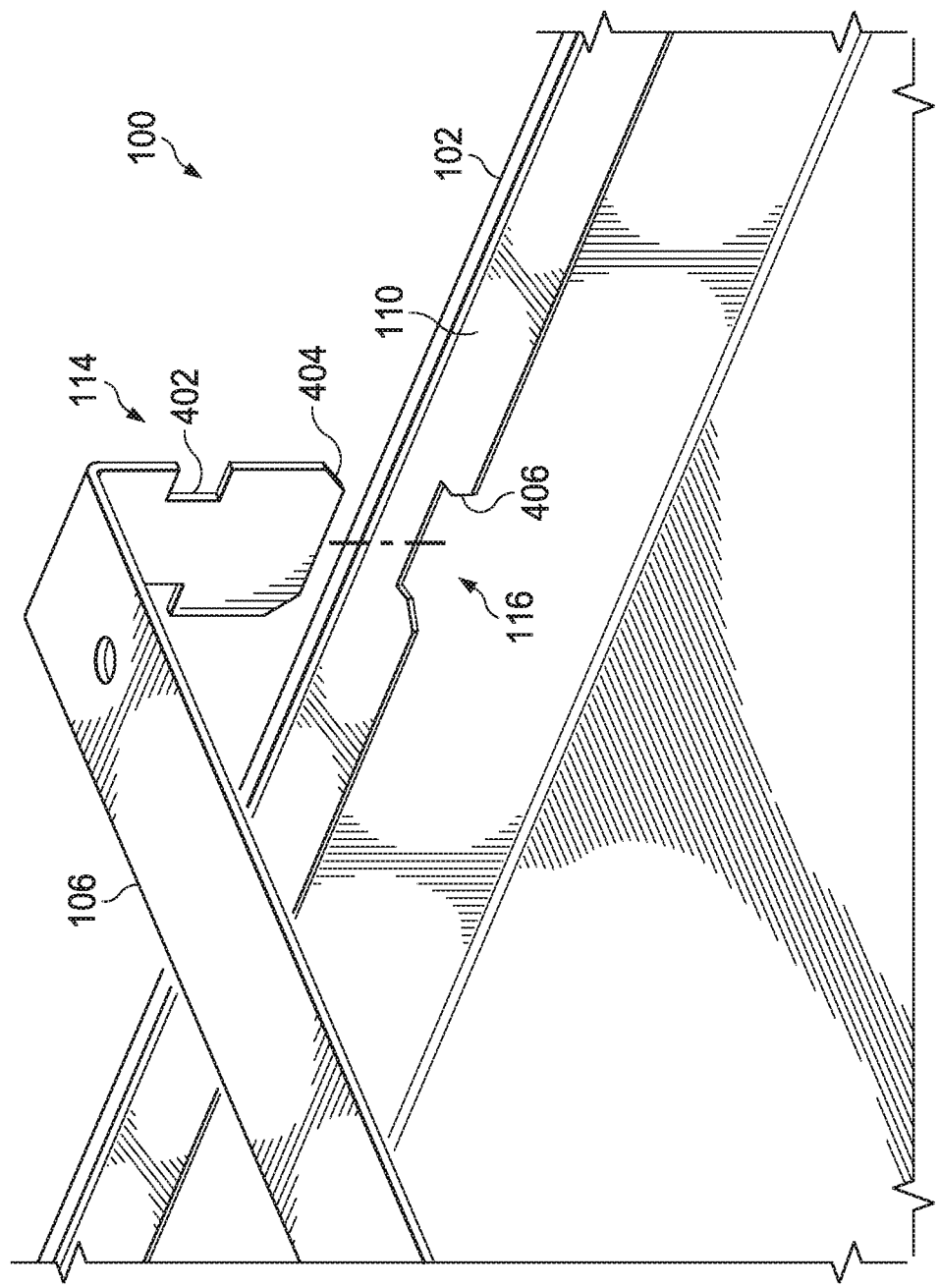
FIG. 4 is a detail showing a connection point between a support bracket and a tool-less and removable condensate drain pan in accordance with an exemplary embodiment of the present disclosure.

FIG. 4 is a detail showing a connection point between a support bracket and a tool-less and removable condensate drain pan 100 in accordance with an exemplary embodiment of the present disclosure. Mechanical locking interface 114 is formed in this exemplary embodiment by cutting, machining or otherwise suitably forming a rectangular notch 402 in either side along the vertical leg of support bracket 106, which locks with a corresponding mechanical locking interface 116 of drain pan body 102, and which can be formed by cutting, machining or otherwise forming a rectangular notch 406 into an upper edge of the upper surface 110 of drain pan body 102. In addition, an angular leading edge 404 can be formed at the end of the vertical leg of support bracket 106, to aid in guiding the vertical leg into rectangular notch 406.

As previously discussed, the location of rectangular notch 402 along the length of the vertical leg of support bracket 106 (or support bracket 104) can be varied, so as to create an incline in the bottom surface of drain pan body 102, to aid in causing condensate to flow to condensate drain 108. Likewise, the locations of rectangular notches 402 at other locations of support brackets 104 and 106 can be coordinated to facilitate in creating the desired incline for drain pan body 102.

Although a specific mechanical interlocking interface has been shown, other suitable mechanical interlocking interfaces can also or alternatively be used. For example, latches, male and female plugs, snap joints, claps, clips, slides, magnetic latches or other suitable devices can be used to connect the vertical legs of support brackets 104 and 106 (or other suitable supports) to drain pan body 102 or other suitable structures, so as to provide a reliable and solid connection between the support brackets 104 and 106 and drain pan body 102, or other suitable structures.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A drainage system comprising:
 a first bracket having a horizontal structure and one or more vertical structures;
 a second bracket having a horizontal structure and one or more vertical structures; and
 a drain pan having a plurality of locking mechanisms, each configured to interlock with one of the vertical structures of the first bracket or the second bracket, wherein one or more of the locking mechanisms comprise a first rectangular notch of the drain pan configured to interlock with one or more rectangular notches of the first bracket, wherein a second of the locking mechanisms comprise a second rectangular notch of the drain pan configured to interlock with one or more rectangular notches of the second bracket, and wherein the rectangular notches of the first bracket and the rectangular notches of the second bracket are configured to create an incline in a bottom surface of the drain pan.

2. The drainage system of claim 1 wherein the horizontal structure of the first bracket comprises a flat surface having a plurality of mounting holes.

3. The drainage system of claim 2 further comprising:
a support structure; and
a plurality of mechanical connectors coupling the support structure to the horizontal structure of the first bracket through the plurality of mounting holes.

4. The drainage system of claim 1 wherein the one or more vertical structures of the first bracket each comprise a complementary locking mechanism corresponding to one of the locking mechanisms of the drain pan.

5. The drainage system of claim 1 wherein the one or more rectangular notches of the first bracket comprise:
a first rectangular notch on a first side of one of the vertical structures of the first bracket; and
a second rectangular notch on a second side of the one of the vertical structures of the first bracket.

6. The drainage system of claim 1 wherein the drain pan is configured to have the incline along the bottom surface after installation to create a gravity feed for captured condensate towards a drain.

7. A drainage system comprising:
a first bracket having a horizontal structure and one or more vertical structures, each having a first locking mechanism;
a second bracket having a horizontal structure and one or more vertical structures, each having a second locking mechanism; and
a drain pan having a plurality of third locking mechanisms, each configured to interlock with one of the first locking mechanisms of the vertical structures of the first bracket or with one or more of the second locking mechanisms of the vertical structures of the second bracket, wherein one or more of the third locking mechanisms comprise a first rectangular notch of the drain pan, and wherein one or more of the first locking mechanisms comprise:
a first rectangular notch on a first side of one of the vertical structures of the first bracket; and
a second rectangular notch on a second side of the vertical structure of the first bracket;
wherein a second of the one or more first locking mechanisms comprise a second rectangular notch of the drain pan configured to interlock with one or more rectangular notches of one of the second locking mechanisms of the second bracket, and wherein the rectangular notches of the first bracket and the rectangular notches of the second bracket are configured to create an incline in a bottom surface of the drain pan.

8. The drainage system of claim 7 wherein the horizontal structure of the first bracket comprises a flat surface having a plurality of mounting holes.

9. The drainage system of claim 8 further comprising:
a support structure; and
a plurality of mechanical connectors coupling the support structure to the horizontal structure of the first bracket through the plurality of mounting holes.

10. The drainage system of claim 7 wherein one or more of the first locking mechanisms of the one or more vertical structures of the first bracket comprises a complementary slot locking mechanism corresponding to one of the third locking mechanisms of the drain pan.

11. The drainage system of claim 7 wherein one or more of the second locking mechanisms comprise a first rectangular notch.

12. The drainage system of claim 7 wherein the drain pan is configured to have the incline along the bottom surface after installation to create a gravity feed for captured condensate towards a drain.

* * * * *